Figure 1:
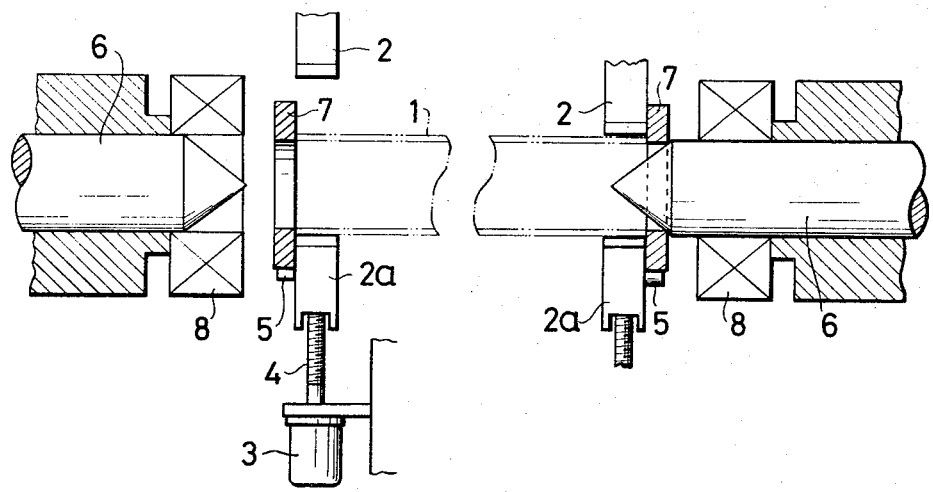

United States Patent [19]

Hirose et al.

[11] 3,839,775
[45] Oct. 8, 1974

[54] APPARATUS FOR ALIGNING A FLANGE

[75] Inventors: Kiyoshi Hirose; Kaoru Shiozawa, both of Chibaken; Yuzi Saito, Kanagawaken, all of Japan

[73] Assignee: Mitsui Shipbuilding and Engineering Co., Ltd., Tokyo, Japan

[22] Filed: May 24, 1973

[21] Appl. No.: 363,500

[30] Foreign Application Priority Data
May 30, 1972  Japan.................................. 47-54203

[52] U.S. Cl................................................ 29/200 P
[51] Int. Cl............................................... B23p 19/00
[58] Field of Search............ 29/200 P, 200 J, 200 R, 29/211 M

[56] References Cited
UNITED STATES PATENTS
3,739,451   6/1973   Jacobson........................... 29/200 J Primary Examiner—Thomas H. Eager
Attorney, Agent, or Firm—Howson and Howson

[57] ABSTRACT

Apparatus for aligning a flange with the axis of a pipe to be welded wherein the flange is centered by a center and the aligned center is held by an electro magnet, and the held flange is engaged with the end of the pipe.

3 Claims, 2 Drawing Figures

APPARATUS FOR ALIGNING A FLANGE

The present invention relates to an apparatus for aligning a flange with the axis of a pipe in the flange welding apparatus.

An object of the present invention is to provide an apparatus which is of relatively simplified construction and can accurately align the flange with axis of the pipe.

Figure 2:
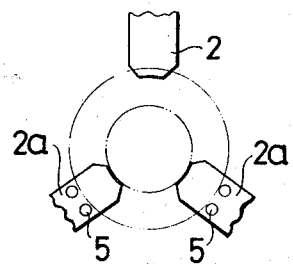

In the drawings:

FIG. 1 is a sectional side view of the flange aligning apparatus in accordance with the present invention; and FIG. 2 is a front view of gripping jaws.

Referring to the drawings, a pair of sets of three radial jaws 2, 2a and 2a are provided at opposite sides of the flange welding apparatus to grip the pipe 1. Each jaw is engaged with a feeding screw such as 4 of a respective stepmotor such as 3 so as to be radially moved. On the outer side of each of the lower jaws 2a are provided are two projecting pins 5 on which a flange 7 may be supported. A pair of centering rods 6 aligned with the axis of the pipe 1 is slidably provided and axially moved by not shown air cylinders. The diameters of the centering rods are greater than that of the central apertures in each flange, and the adjacent opposed ends of the rods are conically tapered with an axis collinear with the rod axes.

All jaws are positioned at retired positions at the first, and lower jaws 2a are then advanced by respective stepmotors according to pulses corresponding to the diameter of the flange to be welded, so that the lower jaws are located at a position suitable for holding a flange on pins 5. Each upper jaw 2 is located at a position where the side face thereof will be contacted by the side face of the corresponding flange.

Thereafter, a flange is dropped onto pins 5 of each set of jaws at opposite sides of the region where the pipe is to be positioned. The flange is supported on the pins 5 so that the center of the flange is initially in slightly lower position than the axis of the pipe. Then, the centering device 6 is advanced to be inserted into the aperture of the flange until it presses the flange against the jaws as shown in the right half side of FIG. 1, thus the flange is accurately aligned with the axis of a pipe to be welded.

Thereafter, the electro magnet 8 coaxially provided with the center 6 is axially moved to the flange to attract the flange, thus the flange is supported by the electro magnet. Then, the electro magnet is retired together with the flange. Subsequently, lower jaws 2a are moved to a proper position for supporting a pipe to be welded, and the pipe 1 is carried on the jaws 2a and the upper jaw 2 is lowered to grip the pipe. Thereafter the electro magnet is advanced to abut the flange on the end of the pipe, and then the flange is welded to the end of the pipe. When all jaws are opened, the pipe with flanges is dropped out and introduced to a next working step. Electromagnets 8 may be standard ring-shaped electromagnets, and the flanges comprise a material such as to be attracted magnetically; for example, the flanges may be entirely of iron or steel.

What is claimed is:

1. Apparatus for aligning a flange with the axis of a pipe to be welded comprising radially movable members for gripping the pipe, means for holding flange so as to permit radial movement of the flange, an axially movable center having a larger diameter than that of the central aperture of the flange and provided to be inserted into the aperture, and an axially movable electromagnet to attract the flange.

2. The apparatus of claim 1, in which said electromagnet is axially movable on said centering device between a first position in which it holds said flange against an end of said pipe and a retracted second position farther from said end of said pipe.

3. Apparatus for aligning a centrally-apertured flange with the axis of a pipe to one end of which pipe said flange is to be welded, comprising:
radially movable members for holding said pipe;
means for holding said flange in approximate alignment with said pipe and so as to permit radial movement of said flange;
an axially movable centering device having a diameter larger than that of the central aperture in said flange and tapered at one end to be insertable in said aperture for positioning said flange in axial alignment with said pipe; and
an electromagnet movable axially along said centering device, said flange being magnetically attractable by said electromagnet, said electromagnet being movable between a position remote from said flange and a position in which it holds said flange against said end of said pipe.

* * * * *